(12) United States Patent
Day et al.

(10) Patent No.: US 12,393,936 B2
(45) Date of Patent: Aug. 19, 2025

(54) SECURE WIRELESS AUDIO AND SPEECH AT A TRANSACTION TERMINAL

(71) Applicant: NCR Atleos Corporation, Atlanta, GA (US)

(72) Inventors: Philip Noel Day, Fife (GB); Grant A. McNicoll, Carnoustie (GB); Gary James Mitchell, Kingsmuir (GB); Andrew David Monaghan, Dundee (GB)

(73) Assignee: NCR Atleos Corporation, Atlanta, GA (US)

( * ) Notice: Subject to any disclaimer, the term of this patent is extended or adjusted under 35 U.S.C. 154(b) by 93 days.

(21) Appl. No.: 17/541,579

(22) Filed: Dec. 3, 2021

(65) Prior Publication Data

US 2022/0092591 A1    Mar. 24, 2022

Related U.S. Application Data

(62) Division of application No. 16/353,380, filed on Mar. 14, 2019, now Pat. No. 12,086,797.

(51) Int. Cl.
*G06Q 20/38* (2012.01)
*G06Q 20/10* (2012.01)
(Continued)

(52) U.S. Cl.
CPC ..... *G06Q 20/3829* (2013.01); *G06Q 20/1085* (2013.01); *G06Q 20/18* (2013.01);
(Continued)

(58) Field of Classification Search
CPC .......... G06Q 20/3829; G06Q 20/1085; G06Q 20/18; G06Q 20/20; G06Q 20/3278;
(Continued)

(56) References Cited

U.S. PATENT DOCUMENTS 9,184,630 B2    11/2015 Jenkins et al.
9,691,080 B1 *   6/2017 Torrance ............ G06Q 30/0255
(Continued)

FOREIGN PATENT DOCUMENTS

EP          2713587 B1    3/2020
WO     WO-2017112812 A1    6/2017

OTHER PUBLICATIONS

"U.S. Appl. No. 16/353,380, Advisory Action mailed Feb. 1, 2024", 3 pgs.
(Continued)

*Primary Examiner* — Patrick McAtee
*Assistant Examiner* — Vincent I Idiake
(74) *Attorney, Agent, or Firm* — Schwegman Lundberg & Woessner, P.A.

(57) ABSTRACT

Audio/speech-based and text-based interactions between a transaction terminal and a user conducting a transaction are provided. In an embodiment, the terminal may establish a direct wireless connection to a user-operated device or an indirection wireless connection to the user-operated device through a proxy device. In an embodiment, the wireless connection is automatically established through a different out-of-band wireless communication between the terminal and the user-operated device. In an embodiment, text-based data for the transaction are provided over a second simultaneous wireless connection that is different from the wireless connection associated with providing the audio/speech data. In an embodiment, audio/speech data provided from the user during the transaction are enhanced for security and are filtered for accuracy using audio-based processing and/or image-based processing. In an embodiment, a speech-to-text and text-to-speech interface for a transaction at the terminal is provided.

9 Claims, 5 Drawing Sheets

(51) Int. Cl.
*G06Q 20/18* (2012.01)
*G06Q 20/20* (2012.01)
*G06Q 20/32* (2012.01)
*G10L 13/00* (2006.01)
*G10L 15/22* (2006.01)
*G10L 15/26* (2006.01)
*H04W 12/04* (2021.01)

(52) U.S. Cl.
CPC ......... *G06Q 20/20* (2013.01); *G06Q 20/3278* (2013.01); *G10L 13/00* (2013.01); *G10L 15/22* (2013.01); *G10L 15/26* (2013.01); *H04W 12/04* (2013.01); *G06Q 2220/00* (2013.01)

(58) Field of Classification Search
CPC .. G06Q 2220/00; G06Q 20/321; G10L 13/00; G10L 15/22; G10L 15/26; H04W 12/04; H04W 12/63; H04W 4/80; H04W 12/50; H04L 63/18; H04L 2463/082; H04L 63/0861; G07F 9/001; G07F 19/201; G07F 19/211
See application file for complete search history.

(56) References Cited

U.S. PATENT DOCUMENTS

| | | | |
|---|---|---|---|
| 9,769,300 | B2 | 9/2017 | Griffin et al. |
| 11,057,525 | B1 | 7/2021 | Bland, Jr. et al. |
| 2006/0036753 | A1 | 2/2006 | Curtis |
| 2009/0143104 | A1* | 6/2009 | Loh .................. G06Q 20/352 340/10.1 |
| 2013/0007241 | A1* | 1/2013 | Trahan ................ H04L 67/133 709/223 |
| 2015/0287408 | A1* | 10/2015 | Svendsen ............... G10L 15/26 704/235 |
| 2016/0012465 | A1* | 1/2016 | Sharp ................. G06Q 20/321 705/14.17 |
| 2016/0065761 | A1 | 3/2016 | Honda |
| 2017/0200147 | A1* | 7/2017 | Ansari ................ G06Q 20/381 |
| 2018/0109418 | A1 | 4/2018 | Cammarota et al. |
| 2018/0204204 | A1* | 7/2018 | Giraudo ................ G07C 5/0816 |
| 2019/0361694 | A1 | 11/2019 | Gordon et al. |
| 2023/0401557 | A1* | 12/2023 | Mossoba ........... A61M 25/0075 |

OTHER PUBLICATIONS

"U.S. Appl. No. 16/353,380, Advisory Action mailed Apr. 7, 2023", 3 pgs.
"U.S. Appl. No. 16/353,380, Advisory Action mailed Apr. 19, 2022", 3 pgs.
"U.S. Appl. No. 16/353,380, Final Office Action mailed Jan. 19, 2023", 14 pgs.
"U.S. Appl. No. 16/353,380, Final Office Action mailed Jan. 26, 2022", 11 pgs.
"U.S. Appl. No. 16/353,380, Final Office Action mailed Oct. 31, 2023", 16 pgs.
"U.S. Appl. No. 16/353,380, Non Final Office Action mailed May 5, 2023", 15 pgs.
"U.S. Appl. No. 16/353,380, Non Final Office Action mailed Jul. 29, 2021", 11 pgs.
"U.S. Appl. No. 16/353,380, Non Final Office Action mailed Aug. 8, 2022", 13 pgs.
"U.S. Appl. No. 16/353,380, Response filed Mar. 12, 2021 to Restriction Requirement mailed Jan. 13, 2021", 8 pgs.
"U.S. Appl. No. 16/353,380, Response filed Mar. 20, 2023 to Final Office Action mailed Jan. 19, 2023", 7 pgs.
"U.S. Appl. No. 16/353,380, Response filed Mar. 28, 2022 to Final Office Action mailed Jan. 26, 2022", 10 pgs.
"U.S. Appl. No. 16/353,380, Response filed Apr. 26, 2022 to Advisory Action mailed Apr. 19, 2022", 7 pgs.
"U.S. Appl. No. 16/353,380, Response filed Aug. 7, 2023 to Non Final Office Action mailed May 5, 2023", 7 pgs.
"U.S. Appl. No. 16/353,380, Response filed Oct. 28, 2021 to Non Final Office Action mailed Jul. 29, 2021", 12 pgs.
"U.S. Appl. No. 16/353,380, Response filed Nov. 8, 2022 to Non Final Office Action mailed Aug. 8, 2022", 7 pgs.
"U.S. Appl. No. 16/353,380, Response filed Dec. 29, 2023 to Final Office Action mailed Oct. 31, 2023", 8 pgs.
"U.S. Appl. No. 16/353,380, Restriction Requirement mailed Jan. 13, 2021", 6 pgs.
U.S. Appl. No. 16/353,380, filed Mar. 14, 2019, Secure Wireless Audio and Speech at a Transaction Terminal.

* cited by examiner

SECURE WIRELESS AUDIO AND SPEECH AT A TRANSACTION TERMINAL

CROSS-REFERENCE TO RELATED APPLICATION

This application is a division of U.S. patent application Ser. No. 16/353,380, filed Mar. 14, 2019, which application and publication is incorporated herein by reference in its entirety.

BACKGROUND

Modern Automated Teller Machines (ATMs) and Self-Service Terminals (SSTs) sometimes offer private audio for the benefit of blind and partially sighted people. This is provided through a 3.5 mm audio socket on the terminal, into which the user inserts their headset or headphones to listen to the audio for that session. This audio jack insertion is often used to trigger a particular flow (e.g. to switch on the private audio guidance, to change screen colors, switch the screen off, etc.). However, ATMs are one type of terminal where Personal Identification Number (PIN) keypads still have a substantial presence in the industry; this is for a variety of security reasons.

Some terminals may also offer a handset (either in place of the 3.5 mm socket for private audio or sometimes for video-based communication). The 3.5 mm socket is a de-facto standard, but requires use of analogue headphones, meaning that the audio cable can get interfere with user operation of the terminal, and typically, the user must bring the headphones for use at the terminal. Similarly, the handset is tethered to the terminal, such that the cable can get in the way during operation of the terminal (the user may also have to overcome a constant pulling of the cord associated with the handset retraction mechanism).

The availability of audio at the terminal may also be mandated by governmental regulations to ensure that sight-impaired individuals have a means of operating the terminal. For security reasons, the audio must also remain private such that bystanders cannot hear the audio or record the audio and potentially discover confidential information associated with the individual operating the terminal.

SUMMARY

In various embodiments, methods, systems, and terminals for providing secure wireless audio at transaction terminals are presented.

According to an aspect, a method for establishing a secure wireless connection between two devices is presented. A first device receives a tag from a second device over a first wireless connection that utilizes a first wireless connection type. The first device maps the tag to a key associated with the second device. The first device uses the key to initiate a second wireless connection to the second device utilizing a second wireless connection type. The first device automatically establishes a communication session with the second device over the second wireless connection using the second wireless connection type.

In another aspect, a method for interacting with a user during a transaction by the user at a transaction terminal is presented. A server receives a hash value from a transaction terminal for an account associated with a user conducting a transaction on the transaction terminal. The server determines whether the user is logged into a service associated with the account through a mobile application processing on a mobile device operated by the user. The server instructs the transaction terminal based on the determination to provide data associated with an interface of the transaction terminal to the server during the transaction. The server provides at least some audio instructions to the mobile device based on the data during the transaction.

In still another aspect, a method for processing speech during a transaction at a transaction terminal, according to an embodiment. A voice input is received at a terminal, the voice input is translated into a text string. The text string is matched to a transaction action for a transaction at the terminal, and the action is processed on the terminal for a portion of the transaction.

DETAILED DESCRIPTION

Figure 1:
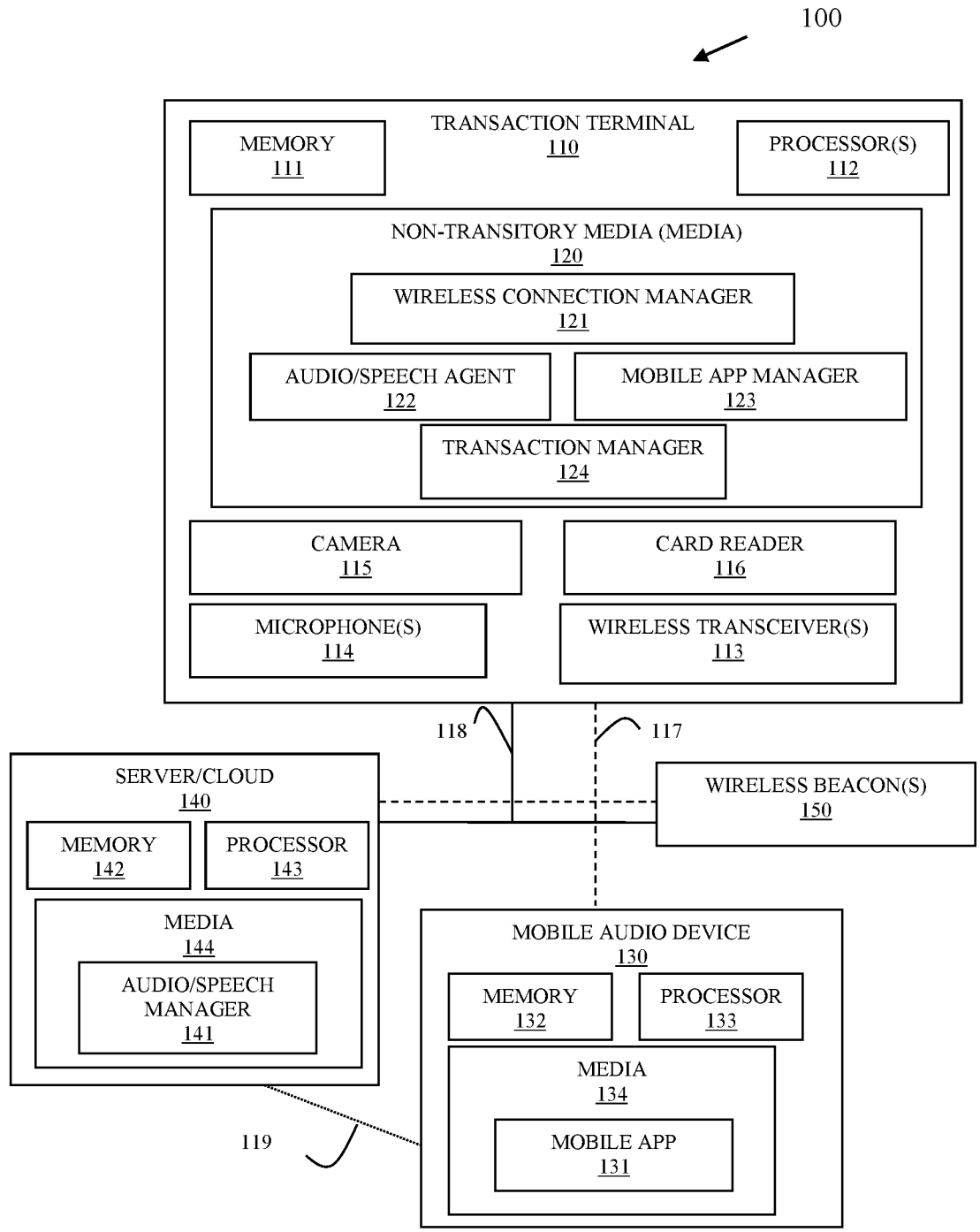
FIG. 1 is a diagram of a system for providing secure wireless audio and speech at a transaction terminal, according to an example embodiment.

FIG. 1 is a diagram of a system 100 for providing secure wireless audio and speech at a transaction terminal, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of providing secure wireless audio and speech at a transaction terminal presented herein and below.

The system 100 includes a transaction terminal 110, a mobile audio device 130, a server/cloud 140, and, optionally one or more wireless beacons 150.

Transaction terminal 110 includes one or more processors 112, memory 111, non-transitory computer-readable storage media 120, one or more wireless transceivers 113, one or more microphones 114, a camera 115, and a card reader 116.

Non-transitory computer-readable storage media 120 includes executable instructions representing a wireless connection manager 121, an audio/speech agent 122, a mobile application (app) manager 123, and a transaction manager 124.

Processor 112 loads the executable instructions to memory 111 and executes the executable instructions, which cause processor 112 to perform processing discussed herein and below for: wireless connection manager 121, audio/speech agent 122, mobile app manager 123, and transaction manager 124.

Mobile audio device 130 includes a processor 133, memory 132, and non-transitory computer-readable storage media 134 having executable instructions representing mobile app 131. Processor 133 loads executable instructions into memory 132 and executes the executable instructions, which cause processor 133 to perform processing discussed herein and below for mobile app 131.

Server/cloud 140 includes one or more processors 143, memory 142, and non-transitory computer-readable storage medium 144 having executable instructions representing audio/speech manager 141. Processor 143 loads executable instructions into memory 142 and executes the executable instructions, which cause processor 143 to perform processing discussed herein and below for audio/speech manager 141.

Terminal 110 may connect to server/cloud 140 and/or wireless beacons 150 over a wired connection 118; and terminal 110 may connect to mobile audio device 130, server/cloud 140, and/or wireless beacons 150 over a wireless connection 117.

Server/cloud 140 connects to mobile audio device 130 over a wireless connection 117. Server/cloud 140 connects to terminal 110 and/or wireless beacons 150 over a wired connection 118 and/or wireless connection 117.

In an embodiment, server/cloud 140 may connect to mobile audio device 130 over a cellular connection 119.

Mobile audio device 130 connects to server/cloud 140, terminal 110, and/or wireless beacons 150 over wireless connection 117.

System 100 provides a variety of novel mechanisms for wirelessly connecting mobile audio device 130 to one or more of: server cloud 140, wireless beacons 150, and terminal 110 during a transaction being conducted by a user at terminal 110. Connection 117 can be directly established between mobile audio device 130 and terminal 110 or indirectly established between mobile audio device 130 and terminal 110 through server/cloud 140 and/or wireless beacons 150.

System 100 also provides novel mechanism for processing audio/speech during the transaction with novel processing of transaction data associated with the transaction.

Direct or indirect connection 117 provides one-way audio communications from terminal 110 to mobile audio device 130 during the transaction; and/or direct or indirect connection 117 provides two-way audio with speech enabled processing during the transaction.

Furthermore, direct or indirect connection 117 may not, in some embodiments, transmit audio; rather text-based data is processed and receiving devices translate the text-based data to generate the audio/speech on the receiving devices. So, audio and/or speech communication can occur, in some embodiments, without transmitting audio data over any wireless connection 117 and/or over any wired connection 118.

During processing of system 100, a direct or indirect connection 117 is securely established between terminal 110 and mobile audio device 130. This direct or indirect connection 117 can be securely established in a variety of novel manners that include: 1) a proximity based mobile audio device identifier provided from mobile audio device 130 over an initial out-of-band direct wireless connection 117 to wireless transceiver 113 (which initiates automatic pairing between mobile audio device 130 and wireless transceiver 113); and 2) detection of card entry into card reader 116 with a detected event provided by audio/speech manager 141 indicating the user of mobile audio device 130 is actively logged into an account associated with the user on server/cloud 140 through mobile app 131 and utilizing server/cloud 140 as a proxy between terminal 110 and mobile audio device 130 for the transaction.

Processing of system 100 also provides for novel mechanism by which transactional data, speech-to-text, and text-to-speech data is processed between terminal 110 and mobile audio device 130.

Conventional wireless pairing between devices requires a variety of manual processing steps. For example, for Bluetooth™ the following takes place: the user device is placed into a pairing mode, the user selects the target device that the user wants to pair with from the user device or the user, selecting the user device from the target device (when user device is a wireless headset of the users, automatically pairing by having the user device configured to accept automatically a first listed device (which is the target device), verification of a shared key if the user device includes a display.

In an embodiment for 1) (as listed above), the pairing process between mobile audio device 130 is modified over the conventional Bluetooth™ pairing process, such that pairing between mobile audio device 130 and terminal 110 is streamlined and includes enhanced security.

In 1), the user pre-registers mobile audio device 130 with server/cloud 140 based on an account of the user. During registration, mobile audio device 130 is assigned a Near Field Communication (NFC) tag from the entity that manages the account of the user; the tag includes a NDEF (NFC Data Exchange Format) tag for use with mobile audio device 130 (can be a headset, a wearable processing device, phone, or tablet). The NDEF tag includes: a Bluetooth™ Media Access Control (MAC) address for mobile audio device, and pair processing details (for hashing, class, etc.). Depending upon a type of mobile audio device 130, the user may have to pre-set up device 130 for automatic Bluetooth® pairing without entering a pairing mode. The user is advised of this behavior and need to revise when registering mobile audio device 130.

In 1), once audio device 130 includes the NFC tag with the NDEF tag, the user visits terminal 110 and presents the NFC tag to an NFC tag reader, such as transceiver 113. Wireless connection manager 121 reads an NFC tag NDEF message generated by the NFC tag based on the embedded NDEF tag. Wireless connection manager 121 automatically initiates a connection between terminal 110 and audio device 130 based on the message using a Bluetooth® transceiver 113. This is an out-of-band Bluetooth® wireless connection 117 because connection 117 was initiated through one type of wireless protocol (NFC) with one type of transceiver 113 (NFC transceiver 113) to automatically establish another wireless connection 117 using a different wireless protocol (Bluetooth™) with another type of transceiver 113 (Bluetooth™ transceiver 113). The wireless Bluetooth™ connection is established without any action required of the user beyond presentation of the pre-registered NFC tag. An audio session is created between audio device 130 and terminal 110 for purposes of supplying audio/speech guidance from terminal 110 to the user through the user's audio device 130 during a transaction.

NFC is a short range wireless protocol which provides greater security to prevent any eavesdroppers attempting to record of listen in on the session. That is, eavesdropping is very difficult when an unauthorized party needs to be physically present within a few centimeters of terminal 110 and tapping mobile audio device 130 to NFC transceiver 130 ensures that the network key for the session (provided with the pairing details of the NDEF tag) is not compromised. This provides assurance that when the Bluetooth™ session is initiated with the network key over Bluetooth™ transceiver 130 only terminal 110 is connected to mobile audio device 130. Thus, the out-of-band session initiation is automatically achieved, achieved with greater security, and achieved without the conventional Bluetooth™ manual connection processing steps being required of the user.

In 1) if mobile audio device 130 is a wireless headset, audio/speech agent 122 uses a Bluetooth™ Advanced Audio Distribution Profile (A2DP) or equivalent standards to set the vocalized audio prompts and media indicator prompts to device 130. Device 130 will then convert the audio stream to sounds the user can hear during the transaction.

In 1) if mobile audio device 130 is a phone or a tablet, audio/speech agent 122 uses Bluetooth™ Wireless Data Exchange standards (or equivalent) to send the vocalized audio prompts and media indicator prompts to mobile app 131. App 131 will then utilize the mobile audio device's speaker to cover the stream into sounds the user can hear.

In 1) volume for the audio provided during the transaction can be controlled using controls on terminal 110 (these can be physical volume controls, onscreen options, or other controls). In an optional extension of this supporting 2-way communication, controls can be sent from audio device 130 to terminal 110 in order to control the volume, and also control play/pause/repeat.

In an embodiment of 1), additional authentication can be added to the above-mentioned connection techniques for purposes of enhancing security of the session associated with the wireless connection 117 and for purposes of processing two-way speech-based communication between terminal 110 and audio device 130. For example, the user may be asked to provide a PIN, fingerprint scan, voice sample, facial recognition, iris scan, as an additional credential for authentication. These additional credentials can be supplied by the user on user's audio device 130 can communicated to audio/speech agent 122 over the wireless connection 117 as a second factor authentication (first factor being the proximity-based NFC tap discussed above) of the user and for purposes of being able to use audio device 130 to receive and process speech directions provided by the user on audio device 130 during the session for the transaction.

In an embodiment of 1), audio/speech agent 122 provides speech directions during a one-way (uni-directional) audio session directly to a wireless beacon 150 that is external to terminal 110. Beacon 150 then streams the speech directions directly to audio device 150. This may be done to improve the bandwidth and responsiveness of the transaction by offloading transmission of the speech directions to an external beacon 150 having a greater coverage range of transmission and higher bandwidth than that which is available to terminal 110 through transceivers 113. In this embodiment, the actual connection 117 established is between audio device 130 and beacon 150, the out-of-band establishment of connection 117 is still achieved via the NFC tap between the audio device 130 and terminal 110. Wireless connection manager 121 causes the automatic pairing between beacon 150 and audio device 130.

In an embodiment, beacon 150 is a WiFi router that can be located anywhere within a facility that includes terminal 110.

In an embodiment, beacon 150 is a standalone Internet-of-Things (IoTs) device in close proximity to terminal 110 and capable of transmitting wireless communications via BlueTooth®, Li-Fi (light-based data communications), or NFC.

In an embodiment of 1), bidirectional (two-way) speech is established between mobile audio device 130 and terminal 110 using the above-referenced second factor authentication to authenticate audio device 130 to terminal 110. Here, transactional data (text-based data and non-audio data) is also exchanged between audio device 130 and terminal 110. This provides the ability to use mobile app 131 to interact with transaction manager 124 wirelessly, such that an interface of mobile app 131 on audio device 130 can be used as a transaction interface for the transaction being conducted during the session. So, the user can provide menu selections and input data through an interface to mobile app 131 on audio device 131. This allows for remote operation of terminal 110 by the user through audio device 130 during the session for the transaction. In an embodiment, the audio device 130 receives both the audio/speech data and transactional data from terminal 110 over a single wireless connection 117. In an embodiment, the audio/speech data is provided over a first wireless connection 117 (as discussed above for the session, such as Bluetooth® and/or using beacon 150 for indirect delivery or terminal 110), but the transactional data is provided over a second simultaneous wireless connection 117 (such as over NFC)—this can be achieved by using two different transceivers 113 (transceivers 113 can be Bluetooth®, WiFi, Li-Fi, and NFC) with a higher bandwidth transceiver 113 providing the audio/speech data and a lower bandwidth transceiver 113 providing the transactional data.

In an embodiment of 1) no audio/speech data is actually transmitted at all between terminal 110 and audio device 130 during the session for the transaction, but audio/speech-based processing is enabled for the session. Each receiving device (terminal 110/audio device 130) includes a mechanism of providing text-based instructions over wireless connection 117 representing audio/speech, and each device translates the text-based instructions received into audio/speech output delivered of that device's speakers.

In an embodiment of 1) no audio/speech data is actually transmitted at all between terminal 110 and audio device 130; rather, just transactional data for the transaction is transmitted between transaction manager 124 and mobile app 131 over wireless connection 117. Here, an NFC transceiver 113 may be used and a transaction interface associated with the transaction manager 124 remotely controlled via a mobile app interface of mobile app 131.

In an embodiment, terminal 110 also provides the conventional audio connection provided through the 3.5 mm jack (as discussed above). In this embodiment, terminal 110 includes the above-noted wireless audio connection 117 for 1) but can still utilize the existing 3.5 mm hardwired connection between audio device 130 and terminal 110.

1) provides an out-of-band initiated wireless audio connection 117 between a user's audio device 130 and terminal 110 (direct or indirect through a beacon 150) making it easier for sight-impaired individuals to obtain an audio/speech driven transaction with terminal 110 by eliminating conventional manual initiation requirements and enhancing security over conventional wireless pairing approaches.

In 2) (as discussed above), a connection 117 between either audio device 130 and terminal 110 is established utilizing a different connection 117 between audio device 130 and server/cloud 140 from that which was discussed in 1. Here, audio/speech manager 141 maintains a between a unique hash value of user's payment card with an entity to a mobile app identity associated with mobile app 131 of audio device 130. This allows audio/speech manager 141 to be notified when the user inserts the payment card into card reader 116 at terminal 110, through notification of the hash value provided by audio/speech agent 122 of terminal 110. Mobile app 131 permits the user to log into an account with an enterprise service of the enterprise. This login event can be communicates as a notification to audio/speech manager 141 from the enterprise service. Audio/speech manager 141 may also receive notification of any logout or session time out after a login from the enterprise service. Connections between server/cloud 140, terminal 110, and an enterprise server associated with the enterprise service utilize secure sockets protocols to encrypt communications and ensure privacy of the communications. The sever/cloud 140, terminal 110, and enterprise server are in trusted and secured relationships during the communications with one another.

In 2), a user first, as an initial prerequisite to initiating a transaction on terminal 110, logs into the user's account through a user-facing interface of mobile app 131. Next, the user inserts the user's payment card into card reader 116 at terminal 110 to initiate a transaction. Wireless connection manager 121 and/or audio/speech agent 122 hashes an identity of terminal 110 along with the payment card number of the payment card to a hash value, which is sent from terminal 110 to audio/speech manager 141 of server/cloud 140. The hash value is mapped to mobile app 131 of audio device 130 and to terminal 110. Audio/speech manager 141 checks to see if the user is logged into mobile app 131 (based on already known notifications received from the enterprise service associated with the account or based on a dynamic request made to the enterprise service). Audio/speech manager 141 determines a network latency between the enterprise service with terminal 110 and audio device 130. If the latency is low, audio/speech agent 122 is instructed to stream audio/speech for the transaction to the enterprise service. If latency is high, audio/speech agent 122 is instructed to data tags in text format representing the audio/speech (vocalized interface prompts, media indicators, etc.) to enterprise service (here mobile app 131 is responsible for translation the data tags into audio/speech that is played on speakers of audio device 130). The enterprise service then delivers the audio/speech or data tags representing audio/speech to mobile app 131. In an embodiment, the audio/speech of data tags are sent from audio/speech agent 122 to audio/speech manager 141, the audio/speech manager 141 initiates a cellular connection 119 or call to audio device 130 and provides audio/speech instructions for the transaction over a voice/cellular connection 119 (here audio/speech manager 141 maintains a mapping to the audio device's phone number in order to make the automated call—note the mobile app identifier can be a mobile phone number).

In an embodiment, the enterprise service is enhanced to include the functionality discussed above for the audio/speech manager 141.

In an embodiment, of 2) communication during the transaction is one-way from terminal 110 through server/cloud 140 and/or enterprise server to audio device 130.

In an embodiment, of 2) communication during the transaction is two way between terminal 110 and audio device 130 utilizing server/cloud 140 and/or enterprise server.

In an embodiment, of 2) any of the above-mentioned options for transmitting and processing both audio/speech data, text tags representing speech, and transactional data can be used as was discussed above with 1).

In 2, volume of audio/speech can be controlled on terminal 110 and/or audio device 130 (physical volume controls, onscreen prompts, or other types of controls). During any two-way audio communication (as discussed above) additional controls may be used from audio device 130 for play/pause/repeat of audio/speech instructions.

As stated above, system 100 also provides novel manners of processing speech-to-text and text-to-speech during a direct and/or indirect connection 117 between terminal 110 and audio device 130.

Accordingly, and in an embodiment, terminal 110 includes microphones 114 and a camera 115. Audio/speech agent 122 is configured to perform a variety of novel processing during a session being conducted at terminal 110 by a user.

In one scenario, a user profile associated with an account of the user includes abstract words or phrases defined by the user to indicate a particular action that audio/speech agent 122 is to process during the transaction on behalf of the user and when the user speaks the abstract word or phrase into one or more of the microphones 114 during the transaction. Audio/speech agent 122 translates spoken audio of the user into text and matches the text to the action during the transaction. The action is then provided by audio/speech agent 122 to transaction manager 124 for processing with the transaction. For example, a user may say "1," "cash," or any other user-defined word or phrase that the user has mapped to a request for a cash withdrawal at terminal 110. Audio/speech agent 122 translates the audio/speech received to text, matches the text to a withdrawal request, and provides a withdrawal request to transaction manager 124 for processing the transaction. The personalization may be obfuscated by the user in the user profile, such that an obscure word means a specific withdrawal amount being requested by the user during the transaction (for example "heavy" mapped to a withdrawal amount of $500).

In an embodiment, audio/speech agent 122 provides interactive voice prompts to the user, such as "for a withdrawal transaction say 1 or cash."

In an embodiment, audio/speech agent 122 askes a series of questions in a dialogue format of the user where the yes or no responses from the user drives the action communicated from audio/speech agent 122 to transaction manager 124 for processing during the transaction.

In an embodiment, transaction manager 121 is configured to expect a personalized text string converted by audio/speech agent 122 from a personalized word or phrase spoken by the user during the transaction. This personalized text string can be used as an additional authentication factor for one aspect of the transaction. For example, if the user is withdrawing more than a user set amount of $100, the user is expected to say an additional authentication phrase, such as "just do it."

In an embodiment, transaction manager 121 is configured to interact with audio/speech agent 122 to perform voice print authentication of the user before any transaction is permitted to be initiated by the user on terminal 110. The user has set up multiple different authentication phrases that are acceptable, each different phrase associated with a prompt. Audio/speech agent 122 randomly selects one of the prompts, the user speaks the word or phrase that maps to that prompt, and both the content of the spoken phrase and the user's known voice print are compared for authenticating the user for the transaction.

In an embodiment, multiple prompts are used and the user is expected to provide multiple spoken words or phrases that corresponding to each of the prompts.

In an embodiment, each of the prompts map to a same phrase that is expected of the user; however, each prompt is associated with a different spoken inflection pattern that the user is expected to use when given that prompt.

As another instance of novel text-to-speech and speech-to-text processing by system 100, audio/speech agent 122 is configured to use multiple sets or arrays of microphones 114 to steer or localize the spoken audio provided by the user during the transaction. One set of microphones 114 are intentionally positioned off axis from the front of terminal 110 (i.e., intentionally directed away from an area that the user is expected to provide speech during a transaction). A second set of microphones 114 are on axis and specifically directed to the area where the user is expected to provide speech during the transaction. The audio detected from the set of microphones 114 directed away from the user's location is processed to clean up the audio detected from the set of microphones 114 directed to the user's location by removing background noise associated with the first set of microphones 114 from the user's speech provided over the second set of microphones 114.

In an embodiment, audio/speech agent 122 also may incorporate proximity detection to determine based on the user's speech a distance of the user from microphones 114. This distance information is processed by an audio steering algorithm in order to more quickly localize the area that should be associated with the user's location from other areas associated background noise. In an embodiment, audio/speech agent 122 uses an optical mechanism that bounces light off targets present at or in a vicinity of terminal 110 and measuring reflected light or time taken to receive selected pulses, or both for the distance determination. The optical mechanism can be non-visual (infrared transmitters and receivers) or passive through visual images taken by camera 115 to determine a level of depth perception in resolving the distance determination. In an embodiment, terminal 110 includes multiple cameras 115, each camera capturing a different angle of the user at terminal 110 and the multiple images processed to resolve the distance determination for the user at terminal 110.

In another scenario of novel text-to-speech and speech-to-text processing by system 100, audio/speech agent 122 uses images taken by one or more cameras 115 of facial features of the user while at terminal 110. Audio/speech agent 122 uses image processing algorithms to interpret lip movements of likely words being spoken by the user during the transaction. These likely words are then used to expedite determinations of the user's speech captured as audio by the microphones 114. For example, a signal peak in the audio can be mapped to lip movements from the images to better differentiate voice input from any background noise detectable from the audio captured by the microphones 114. In another example, probabilities are calculated of likely words being spoken by the user based on the movement of the user's tongue and lips identified in the images provided by the cameras 115.

In an embodiment, audio/speech agent 122 applies frequency filtering to reduce an impact of background noise on the signal associated with the user's voice input. Typical microphones have a frequency response that is significantly broader than the range needed to capture human speech. For example, audio/speech agent 122 may apply a high-pass filter to remove any low frequency content (e.g., something below 200 Hz). Other frequency ranges could also be targeted to boost ineligibility of captured audio that is to be associated with the user's voice input (e.g., a small boost in the 3-6 kHz range to improve detection of otherwise hard to detect S, T, PH phonemes).

One now appreciates how accessibility to vision-impaired individuals and any individual is enhanced with system 100 along with security processing. Direct or indirect connections between user devices 130 and terminals 110 are established as noted above; audio, text-tagged as audio, and transactional data are processed in efficient novel manners during users' sessions with terminals 110 as discussed above (over one or multiple simultaneous wireless connections 117 with audio device 130); spoken audio is processed in a novel manner for enhanced usability and security as discussed above; and/or novel audio/image processing is performed to provide more accurate speech-to-test translation.

In an embodiment, some processing discussed above with respect to audio/speech agent 122, transaction manager 124, and wireless connection manager 121 resides and is processed by wireless connection manager 121, such that wireless connection manager 121 manages direct communications between terminal 110 and audio device 130.

It is to be noted that the processing associated with modules 121-124 may be broken out into more processing modules or subsumed into fewer processing modules.

In an embodiment, transaction terminal 110 includes: an ATM, a Self-Service Terminal (SST), a Point-Of-Sale (POS) terminal, and/or a kiosk.

In an embodiment audio device 130 includes: a phone, a tablet, a wearable processing device, and/or a wireless headset.

In an embodiment, wireless beacons 150 include: Bluetooth® beacons, Wi-Fi routers, IoTs devices, NFC beacons, and/or Li-Fi beacons.

The above-referenced embodiments and other embodiments are now further discussed with reference to the FIGS. 2-5.

Figure 2:
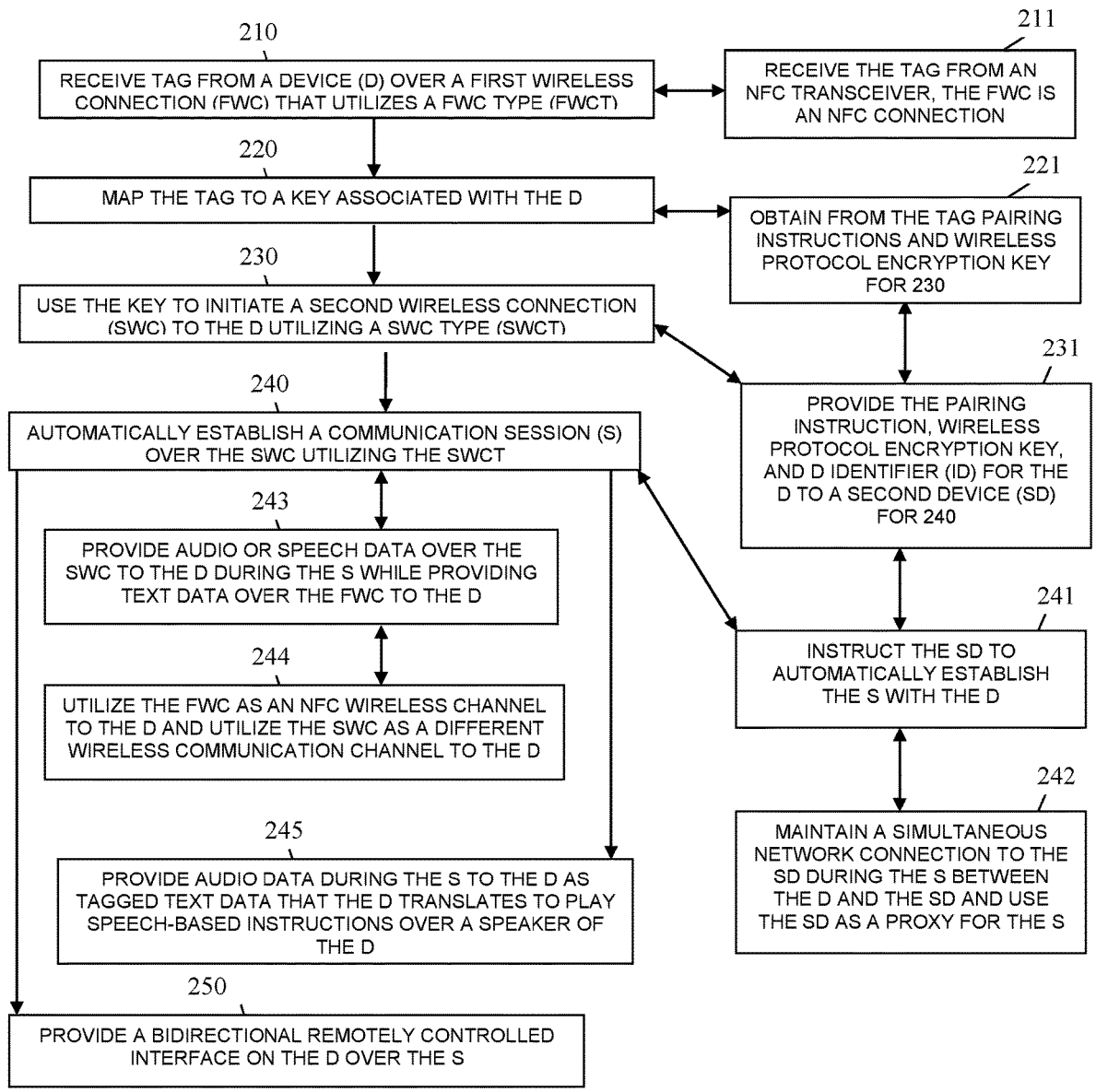
FIG. 2 is a method of establishing a secure wireless audio between two devices, according to an example embodiment.

FIG. 2 is a diagram of a method 200 for establishing a secure wireless audio between two devices, according to an example embodiment. The software module(s) that implements the method 200 is referred to as a "wireless connection manager." The wireless connection manager is implemented as executable instructions programmed and residing within memory and/or a non-transitory computer-readable (processor-readable) storage medium and executed by one or more processors of a device. The processor(s) of the device that executes the g wireless connection manager are specifically configured and programmed to process the wireless connection manager. The wireless connection manager may have access to one or more network connections during its processing. The network connections can be wired, wireless, or a combination of wired and wireless.

In an embodiment, the device that executes the wireless connection manager is transaction terminal 110. In an embodiment, the transaction terminal 110 is one of: a SST, a POS terminal, an ATM, and/or a kiosk.

In an embodiment, the wireless connection manager is all or some combination of the wireless connection manager 121, mobile app manager 123, audio/speech agent 122, and/or transaction manager 124.

At 210, the wireless connection manager receives a tag from a device over a first wireless connection that utilizes a first wireless connection type.

In an embodiment, at 211, wireless connection manager receives the tag from an NFC transceiver. The first wireless connection is an NFC connection.

In an embodiment, the tag is received as a NDEF tag as was discussed above with the FIG. 1.

At 220, wireless connection manager maps the tag to a key associated with the device. The tag also identifies the device as a pre-registered device.

In an embodiment, at 221, wireless connection manager obtains from the tag pairing instructions and a wireless protocol encryption key for processing at 230.

At 230, wireless connection manager uses the key to initiate a second wireless connection to the device that utilizes a second wireless connection type.

In an embodiment of 221 and 230, at 231, wireless connection manager provides the pairing instructions, wireless protocol encryption key and a device identifier for the device to a wireless beacon 150 or a server 140 as a third device for processing associated with 240.

At 240, wireless connection manager automatically establishes a communication session over the second wireless connection utilizing the second wireless connection type.

In an embodiment of 231 and 240, at 241, wireless connection manager instructs the second device to automatically establish the communication session with the device.

In an embodiment of 241 and at 242, wireless connection manager maintains a simultaneous network connection to the second device during the communication session between the device and the second device and uses the second device as a proxy for wireless connection manager to communicate with the device during the communication session.

In an embodiment, the second device is a wireless beacon. In an embodiment, the wireless beacon is a Bluetooth® beacon, an IoT device, a Wi-Fi router, or a Li-Fi router. In an embodiment, the wireless beacon is wireless beacon 150.

In an embodiment, the first wireless connection type is different from the second wireless connection type.

In an embodiment, the first wireless connection type is a same connection type as the second wireless connection type.

In an embodiment, at 243, wireless connection manager provides audio or speech data over the second wireless connection to the device during the communication session while providing text data over the first wireless connection to the device.

In an embodiment of 243 and at 244, wireless connection manager utilizes the first wireless connection as an NFC wireless channel to the device and simultaneously uses the second wireless connection as a different wireless communication channel to the device. In an embodiment, the second wireless connection is a Bluetooth® connection.

In an embodiment of 240 and at 245, wireless connection manager provides audio data during the communication session to the device as tagged text data that the device translated to play speech-based instructions over a speaker of the device.

In an embodiment, at 250, wireless connection manager provides a bidirectional remotely controlled interface on the device over the communication channel.

Figure 3:
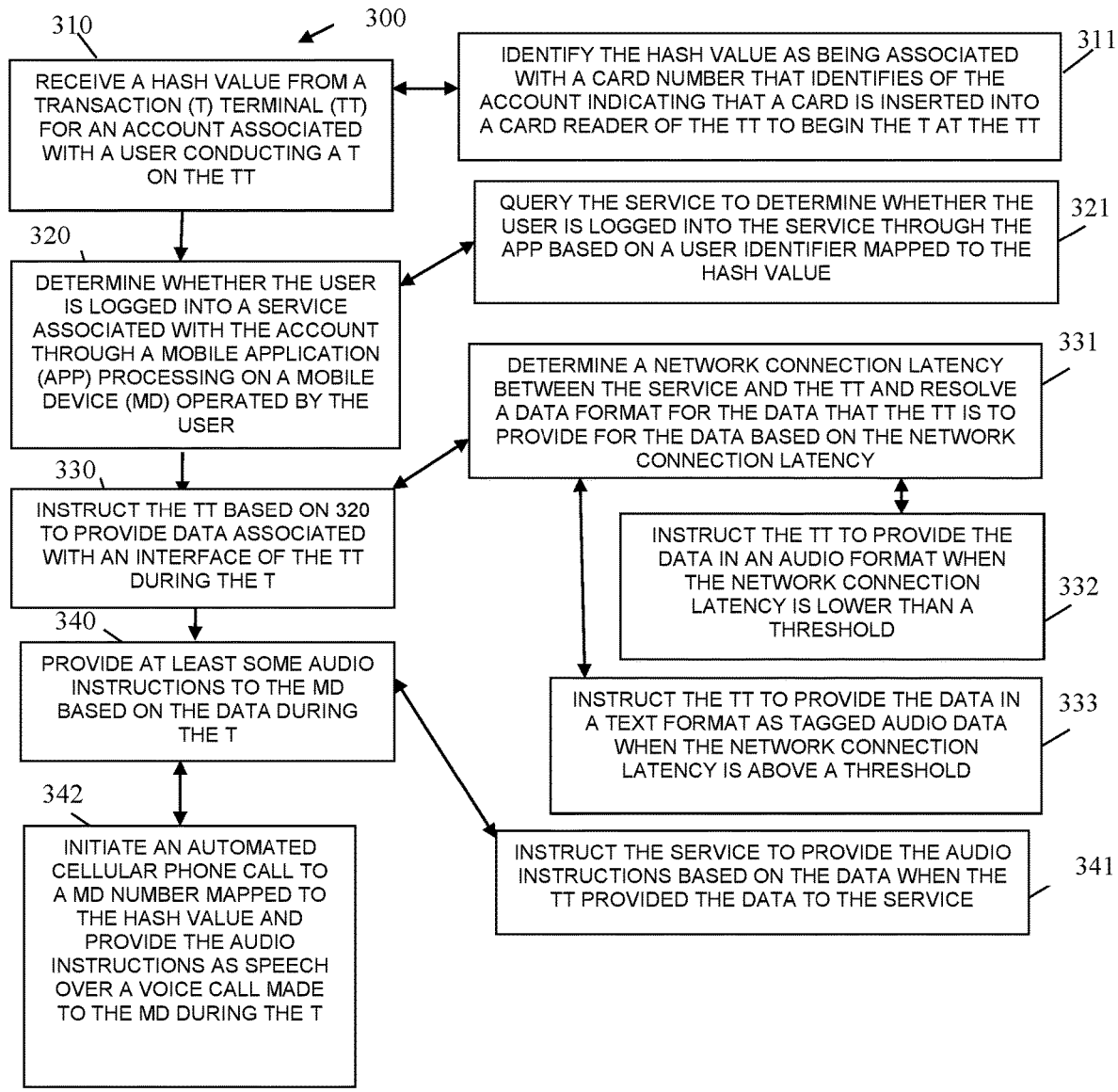
FIG. 3 is a diagram of a method for interacting with a user during a transaction by the user at a transaction terminal, according to an example embodiment.

FIG. 3 is a diagram of a method 300 for interacting with a user during a transaction by the user at a transaction terminal, according to an example embodiment. The software module(s) that implements the method 300 is referred to as an "audio/speech transaction manager." The audio/speech transaction manager is implemented as executable instructions programmed and residing within memory and/or a non-transitory computer-readable (processor-readable) storage medium and executed by one or more processors of a device. The processors that execute the audio/speech transaction manager are specifically configured and programmed to process the audio/speech transaction manager. The audio/speech transaction manager may have access to one or more network connections during its processing. The network connections can be wired, wireless, or a combination of wired and wireless.

In an embodiment, the device that executes the audio/speech transaction manager is the server/cloud 140. In an embodiment, the server/cloud 140 is a collection of servers logically cooperating as a cloud processing environment.

In an embodiment, the audio/speech transaction manager is all of some combination of: the audio/speech manager 141 and/or the enterprise service discussed above with the FIG. 1.

At 310, audio/speech transaction manager receives a unique hash value for a transaction terminal that is associated with an account of a user. The user is conducting a transaction on the transaction terminal.

In an embodiment, at 311, the audio/speech transaction manager identifies the hash value as being associated with a card number that identifies the account and that indicates a card is inserted into a card reader of the transaction terminal to begin a transaction at the transaction terminal.

At 320, audio/speech transaction manager determines whether the user is logged into a service associated with the account through a mobile application that is processing on a mobile device operated by the user.

In an embodiment, at 321, audio/speech transaction manager queries the service to determine whether the user is logged into the service through the mobile app based on a user identifier mapped to the hash value.

At 330, audio/speech transaction manager instructs the transaction terminal to provided data associated with an interface of the transaction terminal during the transaction.

In an embodiment, at 331, audio/speech transaction manager determines a network connection latency between the service and the transaction terminal and resolves a data format for the data that the transaction terminal is to provide for the data based on the network connection latency.

In an embodiment of 331 and at 332, audio/speech transaction manager instructs the transaction terminal to provide the data in an audio format when the network latency is lower than a threshold value.

In an embodiment of 331 and at 332, audio/speech transaction manager instructs the transaction terminal to provide the data in a text format as tagged audio data when the network connection latency is above a threshold value.

At 340, audio/speech transaction manager provides at least some audio instructions to the mobile device based on the data during the transaction.

In an embodiment, at 341, audio/speech transaction manager instructs the service to provide the audio instructions based on the data when the transaction terminal provided the data to the service.

In an embodiment, at 342, audio/speech transaction manager initiates an automated cellular phone call to a mobile device number mapped to the hash value, and audio/speech transaction manager provides the audio instructions as speech over a voice call made to the mobile device during the transaction.

In an embodiment, the processing environment of audio/speech transaction manager is the same processing environment as the service.

In an embodiment, the processing environment of audio/speech transaction manager is different from the service.

Figure 4:
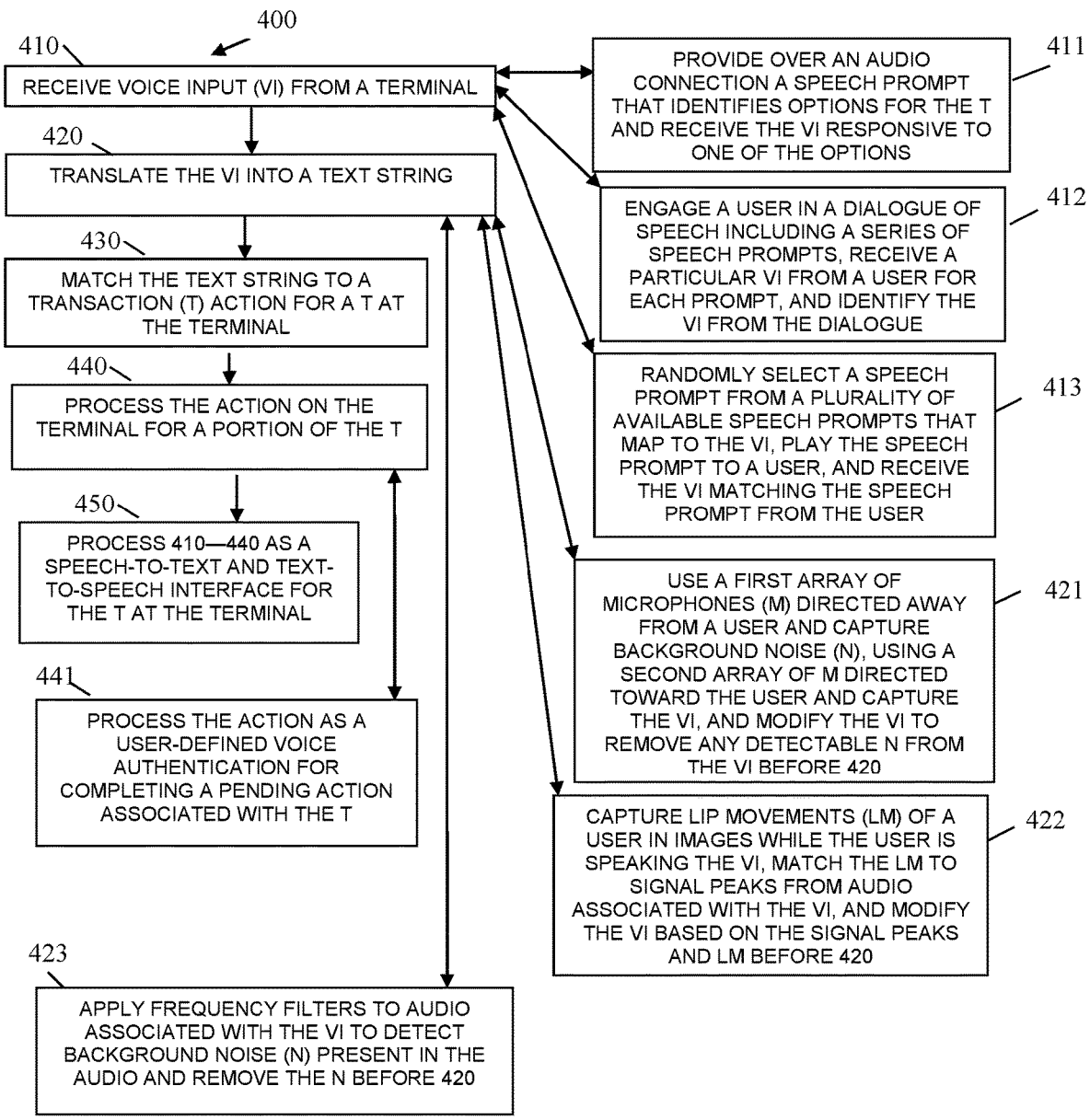
FIG. 4 is a diagram of a method for processing speech during a transaction at a transaction terminal, according to an example embodiment.

FIG. 4 is a diagram of a method 400 for processing speech during a transaction at a transaction terminal, according to an example embodiment. The software module(s) that implements the method 400 is referred to as an "audio/speech agent." The audio/speech agent is implemented as executable instructions programmed and residing within memory and/or a non-transitory computer-readable (processor-readable) storage medium and executed by one or more processors of a device. The processors that execute the audio/speech agent are specifically configured and programmed to process the audio/speech agent. The audio/speech agent may have access to one or more network connections during its processing. The network connections can be wired, wireless, or a combination of wired and wireless.

In an embodiment, the device that executes the audio/speech agent is the transaction terminal 110. In an embodiment, terminal 110 includes: a POS terminal, an ATM, a SST, or a kiosk.

In an embodiment, the audio/speech agent is all or some combination of the audio/speech agent 122, the transaction manager 124, and/or the method 200.

At 410, audio/speech agent receives voice input (speech) from a terminal.

In an embodiment, at 411, audio/speech agent provides, over an audio connection, a speech prompt that identifies options for the transaction and audio/speech agent receives the voice input as response to one of the speech-based options.

In an embodiment, at 412, audio/speech agent engages a user in a dialogue of speech including a series of speech prompts. Audio/speech agent receives a particular voice input from a user for each prompt, and audio/speech agent identifies the voice input from the dialogue.

In an embodiment, at 413, audio/speech agent randomly selects a speech prompt from a plurality of available speech prompts. Each of the available speech prompts map to the voice input. Audio/speech agent plays the speech prompt to a user, and audio/speech agent receives the voice input matching the speech prompt from the user.

At 420, audio/speech agent translates the voice input into a text string.

In an embodiment, at 421, audio/speech agent uses a first array of microphones that are directed away from a user and captures background noise. Audio/speech agent uses a second array of microphones directed toward the user at the terminal and captures the voice input. Audio/speech agent modifies the voice input to remove any detectable background noise from the voice input before translating the voice input into the text string.

In an embodiment, at 422, audio/speech agent captures lip movements of a user in images provided by a camera while the user is speaking the voice input. Audio/speech agent matches the lip movements to signal peaks from audio captured by a microphone for the voice input. Audio/speech agent modifies the voice input based on the matching signal peaks to the pip movements before translating the voice input into the text string.

In an embodiment, at 423, audio/speech agent applies one or more frequency filters to audio captured for the voice input to detect background noise present in the audio and removes the background noise before translating the voice input into the text string.

At 430, audio/speech agent matches the text string to a transaction action for a transaction at the terminal.

At 440, audio/speech agent processes the action on the terminal for a portion of the transaction.

In an embodiment, at 441, audio/speech agent processes the action as a user-defined authentication for completing a pending action associated with the transaction.

In an embodiment, at 450, audio/speech agent is processed as a speech-to-text and text-to-speech interface for the transaction at the terminal.

Figure 5:
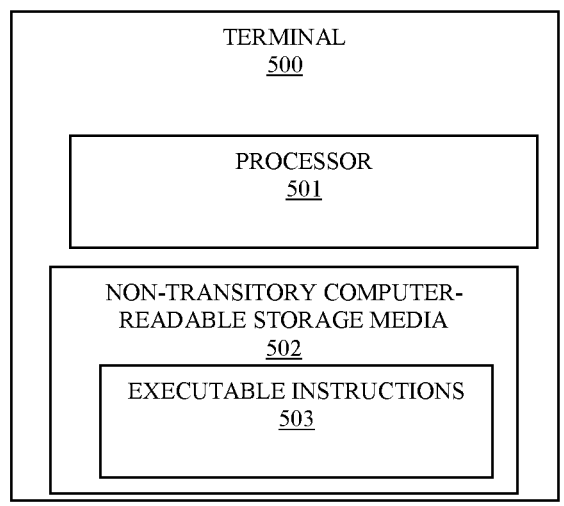
FIG. 5 is a diagram of a transaction terminal for speech-assisted transaction processing, according to an example embodiment.

FIG. 5 is a diagram of a terminal 500 for speech-assisted transaction processing, according to an example embodiment. The terminal 400 includes a variety of hardware components and software components. The software components of the terminal 500 are programmed and reside within memory and/or a non-transitory computer-readable medium and execute on one or more processors of the terminal 500. The terminal 500 may communicate over one or more networks, which can be wired, wireless, or a combination of wired and wireless.

In an embodiment, the terminal 500 implements, inter alia, the processing described above with the FIGS. 1, 2, and 4.

The terminal 500 is the transaction terminal 110.

In an embodiment, the terminal 500 is one of: an ATM, a SST, a POS terminal, and/or a kiosk.

The terminal 500 includes a hardware processor 501 and non-transitory computer-readable storage medium 502 having executable instructions 503.

Executable instructions 503 when executed by processor 501 from medium 502, cause processor 501 to: establish a direct or indirect wireless audio connect to a mobile device of a user engaged in a transaction at the terminal 500; provide audio guidance for the transaction to the mobile device as text tagged data or audio data; translate any user-provided voice inputs to text-based actions associated with the transaction; and process the actions for the transaction on the terminal 500.

In an embodiment, the mobile device is the mobile audio device 130. In an embodiment, the mobile audio device 130 is a phone, a tablet, a wearable processing device, and/or a wireless headset.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving, by a server, a hash value from a transaction terminal for an account associated with a user conducting a transaction on the transaction terminal;
    determining, by the server, whether the user is logged into a service associated with the account through a mobile application that processes on a mobile device operated by the user;

instructing, by the server, the transaction terminal based on the determining to provide data associated with an interface of the transaction terminal to the server during the transaction;

establishing, by the server, a secure wireless connection between the transaction terminal and the mobile device utilizing a second wireless connection type based on a proximity-based mobile audio device identifier and to facilitate the interface for the user to remotely control the transaction at the transaction terminal;

providing, by the server, at least some audio instructions to the mobile device based on the data during the transaction, wherein the mobile device utilizes the second wireless connection type based on the proximity-based mobile audio device identifier; and determining, by the server a network connection latency between the service and the transaction terminal and provides the at least some audio instructions in an audio format when the network connection latency is lower than a threshold and provides the at least some audio instructions as tagged text data that the mobile device translates to play speech-based instructions when the network connection latency is above the threshold.

2. The method of claim 1, wherein determining further includes querying the service to determine whether the user is logged into the service through the mobile application based on a user identifier mapped to the hash value.

3. The method of claim 1, wherein instructing further includes determining a network connection latency between the service and the transaction terminal and resolving a data format that the transaction terminal is to provide for the data based on the network connection latency.

4. The method of claim 3, wherein resolving further includes instructing the transaction terminal to provide the data in an audio format when the network connection latency is lower than a threshold.

5. The method of claim 3, wherein resolving further includes instructing the transaction terminal to provide the data in a text format as tagged audio data when the network connection latency is above a threshold.

6. The method of claim 1, wherein providing further includes instructing the service to provide the at least some audio instructions based on the data when the transaction terminal provided the data to the service.

7. The method of claim 1, wherein providing further includes initiating an automated cellular phone call to a mobile device number mapped to the hash value and providing the at least some audio instructions as speech over a voice call made to the mobile device during the transaction.

8. The method of claim 1, wherein identifying further includes identifying the hash value as being associated with a card number that identifies the account and indicates that a card is inserted into a card reader of the transaction terminal to begin the transaction at the transaction terminal.

9. The method of claim 1, wherein instructing further includes instructing the transaction terminal to provide speech input data received at a microphone associated with the transaction terminal through the interface by the user during the transaction.

* * * * *